United States Patent
Anzai et al.

(10) Patent No.: US 6,485,808 B2
(45) Date of Patent: Nov. 26, 2002

(54) METHOD OF MANUFACTURING AN OPTICAL DISK SUBSTRATE, AN APPARATUS OF MANUFACTURING AN OPTICAL DISK AND AN OPTICAL DISK SUBSTRATE

(75) Inventors: Yumiko Anzai, Ome (JP); Motoyasu Terao, Hinode (JP); Tetsuya Nishida, Odawara (JP); Mokoto Miyamoto, Ome (JP)

(73) Assignee: Hitachi, Ltd., Tokyo (JP)

( * ) Notice: Subject to any disclaimer, the term of this patent is extended or adjusted under 35 U.S.C. 154(b) by 113 days.

(21) Appl. No.: 09/756,799

(22) Filed: Jan. 10, 2001

(65) Prior Publication Data

US 2001/0007704 A1 Jul. 12, 2001

(30) Foreign Application Priority Data

Jan. 12, 2000 (JP) ........................................ 2000-006263
Nov. 27, 2000 (JP) ........................................ 2000-364544

(51) Int. Cl.$^7$ .............................. B32B 3/02; H05H 1/00
(52) U.S. Cl. ...................... 428/64.1; 427/539; 438/795
(58) Field of Search .............................. 428/64.1, 64.4, 428/412, 913; 430/270.1, 495.1, 945; 438/795; 427/532, 539

(56) References Cited

U.S. PATENT DOCUMENTS 5,166,035 A * 11/1992 Kanno ........................ 430/271
5,510,158 A * 4/1996 Hiramoto ..................... 427/582
5,821,175 A * 10/1998 Engelsberg ................. 438/795
6,346,309 B1 * 2/2001 Daimon ..................... 428/64.1
6,217,995 B1 * 4/2001 Handa ........................ 428/220

FOREIGN PATENT DOCUMENTS

| JP | 10036536 | 2/1998 |
| JP | 11191240 | 7/1999 |
| JP | 00207787 | 7/2000 |

* cited by examiner

Primary Examiner—Elizabeth Mulvaney
(74) Attorney, Agent, or Firm—Antonelli, Terry, Stout & Kraus, LLP

(57) ABSTRACT

An optical disk for recording/reproducing information tends to have fine irregularities on its substrate surface that cause an increase in noise, which irregularities are formed during the process of forming the recording layer, which is capable of changing physically or chemically in response to irradiation of laser light. This problem can deteriorate the recording and reproduction characteristics and bring about a defect on a life test or on the storage ability on the disk. To solve this problem, a method of manufacturing an optical disk having a pits-and-lands pattern employs an organic material which is modified by ultraviolet light irradiation. The transmission of the substrate is not more than 50% at one wavelength in a wavelength region from 300 to 375 nm. As a result of the ultraviolet ray irradiation, the surface of an optical disk substrate is smoothed so as to effect a reduction of the substrate noise and an improvement of the recording and reproduction characteristics. Moreover, adhesiveness between the substrate and another layer formed thereon is improved, so that the number of generated defects is reduced.

21 Claims, 3 Drawing Sheets

Relationship between UV-light irradiation time and groove depth

Relationship between UV-light irradiation time and noise

Relationship between UV-light irradiation time and substrate transmittance

Change in molecular weight histogram by UV-light irradiation

METHOD OF MANUFACTURING AN OPTICAL DISK SUBSTRATE, AN APPARATUS OF MANUFACTURING AN OPTICAL DISK AND AN OPTICAL DISK SUBSTRATE

BACKGROUND OF THE INVENTION

The present invention relates to optical disk substrates for optical disk media of the type used in various optical disk devices, such as read-only type optical disks (e.g. CD-Audio, CD-I, CD-ROM, Video-CD, LD, DVD-Video, DVD-ROM, etc.), write-once (WORM) type optical disks (e.g. CD-R, DVD-R, etc.), re-writable type optical disks (e.g. DVD-RAM, DVD-RW, MO, etc.); and, the invention also relates to a method of manufacturing such optical disk substrates and to an apparatus for manufacturing such optical disk substrates.

The conventional method of duplicating an optical disk comprises the steps of: manufacturing a metal stamper having an uneven pattern (i.e. a pattern with microscopic holes, or pits, and lands on the surface of a plastic disk, hereinafter referred to as a "pits-and-lands pattern") consisting of light spot tracking-guide grooves and/or emboss-pits, such as address pits and pits for recording information on the surface thereof, through nickel electric plating from a photoresist-coated master; injecting a plastic substrate material melted at a raised temperature into a mold in which the stamper is placed; and cooling and taking out the substrate so molded, so that a plastic substrate on whose surface the pits-and-lands pattern has been duplicated is produced. This is a common technique (injection molding method) in the manufacturing of plastic substrates for DVD-ROM, DVD-R, DVD-RAM, DVD-RW, MO, etc. as well as currently-used CD-Audio, CD-R, CD-ROM.

In accordance with conventional technology, the stamper, onto which the pits-and-lands pattern is transferred, is manufactured through nickel electric plating from the pits-and-lands pattern formed on a photoresist layer of a photoresist master that is provided in the form of a photoresist-coated glass substrate. In this case, fine irregularities (average roughness being approximately 1 to 3 nm or so) generated, irrespective of manufacturing objectives, on the surface of the photoresist film are also transferred onto the surface of the stamper together with the pits-and-lands pattern consisting of the light spot tracking-guide grooves and/or the address pits, or the emboss-pits, such as the pits for recording information etc. The pits-and-lands pattern is transferred onto the substrate surface from this stamper by the injection molding method in accordance with the conventional technology. Further, a reflective layer or a recording layer is formed on this substrate.

In general, information in the optical disk is reproduced by measuring the intensity of reflected light produced by light irradiated on the reflective layer formed on the substrate surface, or information is recorded in the optical disk and reproduced therefrom by forming a recording layer that changes its property physically or chemically in response to the irradiation of light thereon, using light irradiating a tracking-guide groove part of the recording layer as a guide. That is, in the latter case, the recording and reproduction of information is achieved in such a way that the recording layer formed on the substrate surface is irradiated by laser light to effect a change in the reluctance, thereof, etc. and the strength of the reflected light is used as a carrier of information. In this case, there is a problem in that, since the shape of the recording layer formed on the substrate surface takes a film shape that reflects fine irregularities generated in the surface, irrespective of the manufacturing objectives, it becomes a cause of noise and deteriorates the recording and reproduction characteristics.

SUMMARY OF THE INVENTION

The object of the present invention is to provide an optical disk substrate having improved recording and reproduction characteristics by decreasing the fine irregularities which are accidentally generated on the surface of the substrate, thereby decreasing the noise of the recording medium formed through a stacking process.

The object is achieved by irradiating with ultraviolet light (hereinafter referred to as "UV-light") the photoresist-coated master having the pits-and-lands pattern or an optical disk substrate onto which the pits-and-lands pattern was transferred.

It is generally known that the surfaces of some kinds of plastics are modified by the irradiation of UV-light having a short wavelength and hence a high energy. This is due to a mechanism whereby the UV- light irradiation cuts stable chemical bonds existing on the surface of the plastic and oxygen atoms in the air connect to disconnected bonds or the like.

Since the optical disk substrate manufactured by injection molding is made of a plastic material, the irradiation of UV-light having a short wavelength and hence a high energy cuts the chemical bonds in a thickness range from the substrate surface to the depth of only a few gm, which in turn induces an incrementing of the light absorption coefficient in a wavelength region from 280 to 400 nm and also causes the substrate surface to be flattened to a smooth surface. In this case, when the main wavelength of the irradiating UV-light is 254 nm, which generates no ozone, decomposition in the vicinity of the substrate surface and smoothing of the surface occur significantly; whereas, if UV-light having a 184 nm wavelength that generates ozone is used together with the UV-light having a 254 nm wavelength, ozone is generated by this UV-light in the vicinity of the light source, and, in turn, the UV-light having a 254 nm wavelength is absorbed by a decomposition reaction of ozone. Consequently, an increase in the optical absorption and a smoothing of the substrate surface in the vicinity of the substrate are difficult to achieve.

In the case where the optical disk substrate is polycarbonate, which is a plastic containing oxygen atoms on the main organic atomic-chain thereof, the effect produced by the UV-light irradiation becomes significant.

Therefore, in accordance with the present invention:

(1) the substrate to be used is an optical disk substrate made of polycarbonate that has a pits-and-lands pattern consisting of light spot tracking-guide grooves and/or address pits, or emboss-pits such as pits for recording information etc., characterized in that the transmittance of the substrate is not more than 50% at one wavelength in a wavelength region from 300 to 375 nm. In a substrate that has not been treated by UV-light irradiation, because the transmittance at this wavelength is much higher than that of the substrate of the present invention, whether or not the substrate has been treated with the UV-light irradiation, its irradiation conditions, etc. can be estimated by means of simple optical measurement; and, this data can be used as an index of the surface smoothing. With another method for the purpose of smoothing the surface, the change in the transmittance differs from that of the present method. By the way, the substrate thickness to be used is specified to be 0.6 mm or 1.2 mm.

(2) The substrate to be used is an optical disk substrate as described in paragraph (1), characterized in that the wavelength dependence of the transmittance of the substrate is such that the absorption starts to increase at a wavelength of 650 nm or so and increases further toward a short wavelength side; that is, the transmittance starts to decrease, and at a wavelength of 260 nm or so and thereafter the transmittance becomes virtually 0%.

(3) The substrate to be used is an optical disk substrate as described in paragraph (1), characterized in that the hardness of the substrate in the thickness range from the surface thereof to a depth of approximately 0.5 $\mu$m is higher than that of the substrate excluding surface parts from the surface thereof to a depth of approximately 100 $\mu$m by 50 to 85%. Now, since it has been confirmed that UV-light irradiation will increase the hardness of the surface, the measured hardness was used as an index of surface smoothness, which is relatively difficult to measure. If the surface hardness is high, it brings about an effect that the recording medium is hard to deteriorate even when overwriting is conducted a number of times.

(4) The substrate to be used is an optical disk substrate as described in paragraph (3), characterized in that the hardness of the substrate in the thickness range from the surface thereof to the depth of 0.5 $\mu$m is not less than 140N/mm$^2$.

(5) The substrate to be used is an optical disk substrate as described in paragraph (1), characterized in that the average roughness (Ra) of the fine irregularities generated, irrespective of the manufacturing objectives, on the substrate surface is not more than 0.8 nm.

(6) The substrate to be used is an optical disk substrate characterized in that the polystyrene equivalent weight-average molecular weight of the optical disk substrate, which has a pits-and-lands pattern consisting of light spot tracking-guide grooves and/or address pits, or emboss-pits such as the pits of recording information etc., in the thickness range from the surface thereof to a depth of approximately 20 $\mu$m is smaller than that of the substrate excluding the surface parts from the surface thereof to a depth of approximately 100 $\mu$m by 4 to 22%. Since it was confirmed that by irradiation of UV-light having a short wavelength and a high energy the chemical bonds on the substrate surface were cut and, consequently, the average molecular weight changed, an index of the surface smoothness can be estimated by measuring both a molecular weight histogram of the substrate in the thickness range from the surface thereof to a depth of approximately 20 $\mu$m and a molecular weight histogram of the substrate excluding the surface parts from the surface to a depth of approximately 100 $\mu$m and comparing these histograms.

(7) The optical substrate to be used is an optical disk substrate described in the paragraph (6) characterized in that the polystyrene equivalent average molecular weight of the optical disk substrate in the thickness range from the surface thereof to a depth of approximately 20 $\mu$m is not more than 3.0.

(8) The optical substrate to be used is an optical disk substrate as described in one of the paragraphs (1) to (6), characterized in that the substrate is made of a plastic containing oxygen atoms on the main organic atomic-chain thereof as a main component. Due to UV-light irradiation at a short wavelength and a higher energy, the substrate is caused to undergo an optical reaction (light induced Fries rearrangement). It was found that, during this reaction, the main organic atomic-chain containing oxygen atoms was cut and the substrate surface was modified so as to be smoother. Because of this mechanism, the effect of UV-light irradiation can be estimated beforehand from knowledge of the main component of the plastic used.

(9) The information recording medium to be used is an information recording medium characterized in that an optical disk substrate selected from the group consisting of the substrates of the paragraphs (1) to (6) is used, and a reflective layer or a recording layer that changes in response to laser light irradiation is formed on the substrate directly or with an intermediate layer interposed. By the way, in accordance with this invention, the shape of the unevenness on the optical disk substrate is called a light spot guiding groove (so-called groove), and it is assumed that information is recorded on the recording layer on the light spot guiding groove. However, a region where information is recorded is not necessarily a groove in particular. The fundamental idea of the present invention is to flatten minute irregularities in the surface shape by UV-light irradiation, which irregularities are generated at the time of forming the shape of the unevenness on the optical disk substrate and cause a noise component in the signal. Therefore, the present invention is effective, for example, for the case where the information recording region is a region between the grooves (so-called land). Especially, in a scheme where information is recorded both on the land and on the groove (land-groove scheme), the depth of the trench (equivalent to the size of the step between the land and the groove) is $\lambda/6n$ ($\lambda$: wavelength of a laser beam used for reproducing information, n: refractive index of the optical disk substrate at a wavelength $\lambda$.) and is deep compared to a trench depth of $\lambda/8n$ in the case of the groove recording scheme. When the trench is deep, as in this case, generally the noise component tends to become larger. However, the use of the present invention makes it possible to reduce the noise of the optical disk substrate for a land-groove recording scheme significantly.

Although it becomes possible for noise reduction of the optical disk substrate to be achieved by the method described above in detail, when the optical disk substrates are manufactured in mass production, various problems tend to occur. For example, the time necessary for manufacturing one sheet of the optical disk substrate by a normal injection molding machine is a few seconds to 10 seconds or so. However, in the case where the method of manufacturing the optical disk substrate according to the present invention was adopted, the time necessary for manufacturing one sheet of the optical disk substrate increased to a few hundred seconds, and, hence, the method was not practical. Moreover, when a few tens of thousands of sheets of the optical substrates were irradiated by UV-light, since the output of the ultraviolet lamp decreased gradually, there arose a problem that a sufficient noise reduction effect was not achieved over the course of time. With an intent to solve these problems, the present inventors carried out an extensive investigation and found that these problems can be solved by the method of manufacturing an optical disk substrate and the apparatus for manufacturing an optical disk substrate that will be described below.

(10) A method of manufacturing an optical disk substrate, comprises a step of reforming the surface of the above-stated polycarbonate by causing an oxygen containing gas to flow on the optical disk substrate, which is composed of a plastic material containing oxygen atoms in the main organic atomic-chain thereof and has irregularities on its surface, and by irradiating ultraviolet light having a wavelength of approximately 254 nm on the optical disk substrate while shielding light having a wavelength of approximately 185 nm.

(11) An apparatus for manufacturing an optical disk substrate that performs surface processing of the optical disk substrate, comprises a UV-light source for irradiating light having a wavelength of approximately 254 nm while shielding light having a wavelength of approximately 185 nm, and means for changing the distance between the optical disk substrate and the UV-light source.

(12) An apparatus for manufacturing an optical disk substrate that performs surface processing of the optical disk substrate, comprises an UV-light source for irradiating light having a wavelength of approximately 254 nm while shielding light having a wavelength of approximately 185 nm, and means for the optical disk substrate and the UV-light source.

(13) An apparatus for manufacturing an optical disk substrate that performs surface processing of the optical disk substrate, comprises an UV-light source for irradiating light having a wavelength of approximately 254 nm while shielding light having a wavelength of approximately 185 nm, and means for controlling the time of the UV-light irradiation from the UV-light source onto the optical disk substrate.

(14) An apparatus for manufacturing an optical disk substrate that performs surface processing of the optical disk substrate, comprises a plurality of UV-light sources for irradiating light having a wavelength of approximately 254 nm while shielding light having a wavelength of approximately 185 mn, and means for controlling the emission energy of each of the UV-light sources independently.

Moreover, there arose a problem in that, depending on the material and shape of the substrate holder for holding the optical disk substrate during the UV-light irradiation, the optical,disk substrate is heated, and, consequently, the optical disk substrate deformed substantially. To solve this problem, all that is needed is to use an apparatus for manufacturing an optical disk substrate as described below.

(15) An apparatus for manufacturing an optical disk substrate according to paragraph (12), comprising a substrate holder made of a fluoroplastic for holding the optical disk substrate.

(16) An apparatus for manufacturing an optical disk substrate according to paragraph (15), wherein the fluoroplastic is polytetrafluoroethylene.

BRIEF DESCRIPTION OF THE DRAWINGS

Other objects and advantages of the invention will become apparent from the following discussion of the accompanying drawings, wherein.

DESCRIPTION OF THE PREFERRED EMBODIMENTS

First Embodiment

Figure 1:
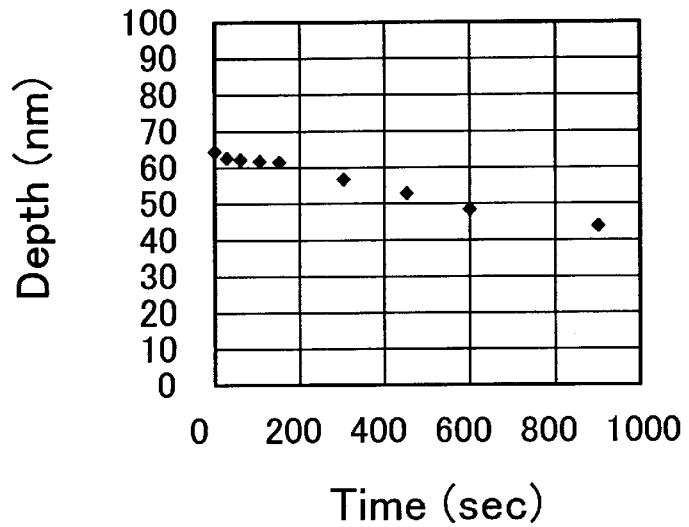
FIG. 1 is a graph showing a relationship between UV-light irradiation time and tracking- groove depth in accordance with one embodiment of the present invention.

A metal stamper was manufactured through nickel electric plating from a photoresist-coated master having a pits-and-lands pattern with light spot tracking-guide grooves and pits representing addresses etc. on its surface. Polycarbonate was melted at a raised temperature and poured into the mold in which the stamper is set; subsequently it was pressurized to form a disk; and then it was cooled so as to become hardened. After these processes, the disk was taken out of the mold, so that an optical disk substrate made of polycarbonate on whose surface the pits-and-lands pattern was formed was provided. Further, UV-light irradiation was conducted on the surface of the pits-and-lands pattern of the substrate for 150 seconds, so that the fine irregularities generated on the surface of the optical disk substrate, irrespective of the manufacturing objectives, were smoothed. The lamp used for this treatment was a low-pressure mercury lamp C-20OUF (product of Chemitronics Co. Ltd.) having a main wavelength of 254 nm. The distance from the lower side of the lamp to the substrate was set to 10 mm. Eight lamps were arranged in parallel and the substrate positioned under the lamps was irradiated by the UV-light while the substrate was rotated in an ambient gas of oxygen flowing at a rate of 10 liters/minute. During the UV-light irradiation, the lamps were kept turned on and the processing time was controlled by a timer, and its value is defined as a time period from the insertion of the substrate into a UV-light irradiation device to the time the substrate is taken therefrom.

The substrate was observed with a scanning microscope, and as a result, it was confirmed that the fine irregularities that were generated. irrespective of the manufacturing objectives, on the surface of the photoresist film can be decreased to a large extent by the UV-light irradiation. Similarly, the surface profile was measured with an atomic force microscope (AFM), and, as a result, it was found that the average surface roughness decreased by approximately 25% compared to thap before the UV-light irradiation. The thickness of the substrate was found to decrease by approximately 30 nm. On the other hand, the macroscopic shape of the pits-and-lands pattern consisting of the light spot tracking-guide grooves, the pits representing addresses, etc. did not change.

The relationship between the UV-light irradiation time and the average surface roughness measured by an AFM is as follows. The relationship between the UV-light irradiation time and the UV-light irradiation energy density is shown in Table 1. Measurement of the UV-light irradiation energy was carried out with a lux meter UVR1 (product of TOPCON CORP.) equipped with a light detector UVR25 (for a 254 nm wavelength).

TABLE 1

| UV-light irradiation time (second) | Irradiation energy density (J/cm$^2$) | Average surface roughness (nm). |
| --- | --- | --- |
| 0 | 0 | 1.0 |
| 30 | 3.9 | 1.0 |
| 60 | 7.8 | 0.8 |
| 100 | 13.0 | 0.7 |
| 150 | 19.5 | 0.6 |
| 300 | 39.0 | 0.5 |
| 450 | 5.5 | 0.5 |
| 600 | 78.0 | 0.6 |
| 900 | 117.0 | 1.3 |

As can also be understood from the results, when the UV-light irradiation time was relatively short, the change in the average surface roughness was small. For a UV-light irradiation time equal to 60 seconds or more, the effect of smoothing the substrate surface became observable.

However, too long a UV-light irradiation time caused the surface to become coarse and the average surface roughness to become larger conversely.

Figure 2:
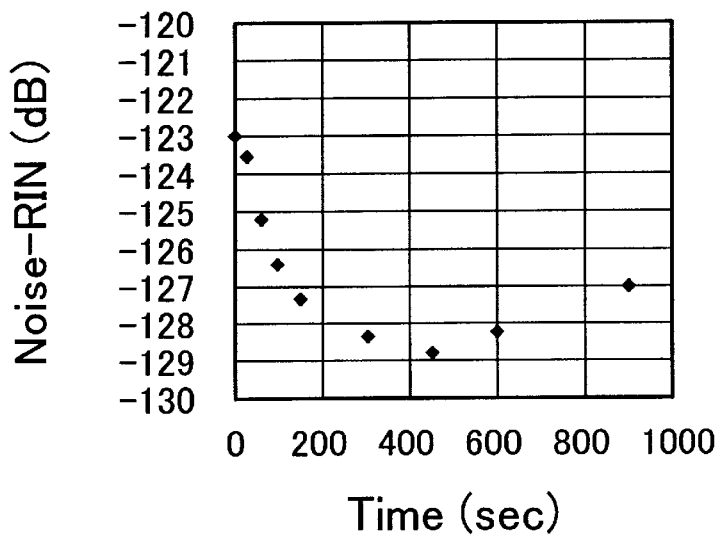
FIG. 2 is a graph showing a relationship between the UV-light irradiation time and the noise in the embodiment of the present invention.

Next, in order to examine the relationship between the UV-light irradiation time and the noise level of substrates having different amounts of surface roughness resulting from different UV-light irradiation times, the RIN (Relative Intensity Noise) was measured. Here, RIN denotes a noise level normalized by the reflectance. The result is shown in Table 2. The result is also shown in FIG. 2.

TABLE 2

| UV-light irradiation time (second) | Average surface roughness (nm) | Variation of noise level (dBm/Hz) |
| --- | --- | --- |
| 0 | 1.0 | −123.0 |
| 30 | 1.0 | −123.5 |
| 60 | 0.8 | −125.2 |
| 100 | 0.7 | −126.4 |
| 150 | 0.6 | −127.3 |
| 300 | 0.5 | −127.1 |
| 450 | 0.5 | −128.8 |
| 600 | 0.6 | −125.6 |
| 900 | 1.3 | −123.7 |

It was found from the results that when the fine irregularities on the substrate surface were smoothed and the average surface roughness reduced, the noise lever lowered accordingly. It was found from the two relationships that the UV-light irradiation time, for which the effect of smoothing of the fine irregularities existing on the substrate surface and, hence, the reducing of the noise level was obtained, was from 60 to 600 seconds inclusive, and the preferred average roughness attainable in this range was 0. 8 nm or less. A more preferable range is from 100 to 450 seconds inclusive.

In the same way, the substrate made of polyvinyl chloride was also examined regarding the change produced by the UV-light irradiation and the result is in Table 3.

TABLE 3

| UV-light irradiation time (second) | Average surface roughness (nm) | Variation of noise level (dBm/Hz) |
| --- | --- | --- |
| 0 | 13.0 | −118.0 |
| 30 | 13.0 | −118.0 |
| 60 | 13.2 | −117.9 |
| 100 | 13.3 | −117.9 |
| 150 | 13.3 | −117.9 |
| 300 | 13.3 | −117.9 |
| 450 | 13.8 | −117.0 |
| 600 | 14.1 | −116.8 |
| 900 | 14.8 | −116.4 |

As can be understood from the result, the polyvinyl chloride substrate did not show a change in a direction toward a smoother substrate surface in response to the UV-light irradiation.

Hereafter, only results of the polycarbonate substrate will be shown.

It was found that the UV-light irradiation also caused a change in the depth of the tracking-guide groove and the pits representing addresses. An example of the relationship among the UV-light irradiation time, the depth of the tracking-guide groove, and the read-out error rate is shown in Table 4. The relationship between the UV-light irradiation time and the depth of the tracking-guide groove is also shown in FIG. 1.

TABLE 4

| UV-light irradiation time (second) | Tracking-guide groove depth (nm) | Read-out error rate (%) |
| --- | --- | --- |
| 0 | 64.9 | 7.5 |
| 30 | 63.5 | 6.5 |
| 60 | 62.7 | 6.0 |
| 100 | 62.0 | 5.5 |
| 150 | 61.1 | 5.0 |
| 300 | 57.2 | 5.5 |
| 450 | 53.5 | 5.7 |
| 600 | 48.9 | 6.0 |
| 900 | 40.5 | 7.5 |

It was found that when the UV-light irradiation time became longer, the read-out error rate grew larger.

Next, the relationship between the ambient gas and the amount of etching of the polycarbonate substrate in the case of the UV-light irradiation was examined. It was found that, while a mixed gas of oxygen and the air was made to flow, a change in the concentration of oxygen brought about a change in the reaction speed of the polycarbonate substrate correspondingly. Specifically, with an increasing oxygen concentration, the reaction was accelerated more. This is attributed to the fact that the UV-light irradiation cuts the chemical bonds on the surface of the polycarbonate substrate and the disconnected bonds are liable to combine with oxygen atoms. The relationship between the oxygen concentration in the ambient gas and the amount of etching of the polycarbonate substrate when the UV-light irradiation time was set to 300 seconds is shown in Table 5.

TABLE 5

| Oxygen concentration (%) | Amount of etching (nm) |
| --- | --- |
| 20 | 53 |
| 50 | 62 |
| 70 | 69 |
| 100 | 79 |

In the case where nitrogen was made to flow at a rate of 10 liter/minute and the UV-light irradiation time was set to 300 seconds similarly to the above case, the amount of etching of the substrate was 45 nm. Moreover, in the case where no gas was made to flow and the ambient condition was as it was, and in the case where dry air was made to f low at a rate of 10 liters/minute, the amount of etching of the substrate was 48 nm identically. From these results, it can be concluded that although oxygen is necessary to increase the reaction speed, the atmosphere as it is, or a flow of dry air or nitrogen make no difference, except for the reaction speed. Therefore, even in the case where it is difficult to make oxygen gas flow due to structural restriction of an apparatus, the UV-light irradiation can be performed without difficulty.

Figure 3:
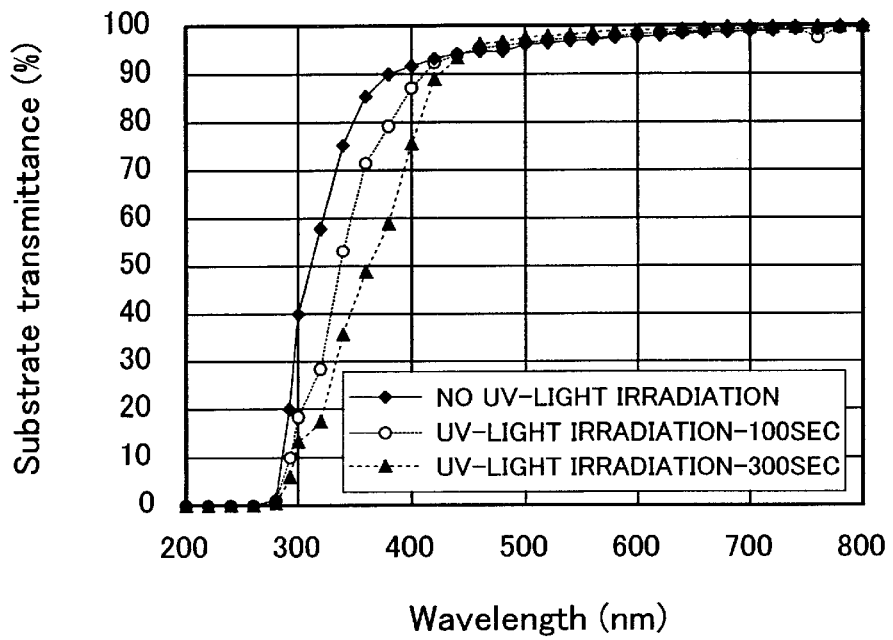
FIG. 3 is a graph showing a relationship between the UV-light irradiation time and a change in substrate transmittance depending on wavelength in the embodiment of the present invention.

Further, FIG. 3 shows the change in the wavelength dependence of the transmittance as a function of the UV-light irradiation time f or the substrate. With respect to the transmittance, a change indicating a positive correlation to the UV-light irradiation time occurred. In the substrate before the UV-light irradiation, in the vicinity of the 650 nm wavelength toward the short wavelength side, the transmittance starts to decrease; down to the 450 nm wavelength or so, the transmittance maintains a slow decline; in the vicinity of the 400 nm wavelength or so, the transmittance shows a noticeable fall; and, finally, in the vicinity of the 260 nm wavelength and thereafter, the transmittance becomes almost 0%. In contrast to this, in the substrate after the UV-light irradiation, the transmittance shows a similar characteristic down to the 650 nm wavelength from the long wavelength side and at the 260 nm wavelength and thereafter; but, the vicinity of the 440 nm wavelength, the transmittance starts to show a noticeable fall, and, in the vicinity of wavelengths of 280 to 320 nm, a second curve indicating a transmittance change emerges. This second curve changes its profile to the UV-light irradiation time as follows. Table 6 shows the transmittance of the CD substrate at a wavelength of 300 nm wavelength for different UV-light irradiation times.

TABLE 6

| UV-light irradiation time (second) | Substrate transmittance (%) |
|---|---|
| 0 | 58 |
| 30 | 52 |
| 60 | 32 |
| 100 | 28 |
| 150 | 25 |
| 300 | 18 |
| 450 | 15 |
| 600 | 12 |
| 900 | 10 |

In addition, the substrate transmittance at wavelengths of 450 nm and 300 is shown in Table 7.

TABLE 7

| UV-light irradiation time (second) | Substrate transmittance at 450 nm wavelength (%) | Substrate transmittance at 300 nm wavelength (%) |
|---|---|---|
| 0 | 95 | 53 |
| 30 | 95 | 52 |
| 60 | 95 | 32 |
| 100 | 95 | 28 |
| 150 | 95 | 25 |
| 300 | 95 | 18 |
| 450 | 88 | 15 |
| 600 | 80 | 12 |
| 900 | 75 | 10 |

It is seen from these results that when the substrate transmittance is not less than 80% at a wavelength of 450 nm and not more than 35% a wavelength of 300 nm, the above-described noise level and pit read-out error rate are low. By measuring the substrate transmittance, whether the UV-light treatment has been conducted, and also its processing conditions, the state of the substrate surface, etc. can be inferred approximately.

On a substrate surface which has undergone UV-light treatment, a ZnS—SiO$_2$ film 120 nm thick as a lower protective layer, a Ge-Sb-Te film 8 nm thick as an information recording layer, a ZnS—SiO$_2$ film 135 nm thick as an upper protective layer, a Cr—O layer 30 nm thick as a heat-diffusion layer and also a reflective layer, and an Al—Ti film 80 nm thick were stacked. The disk was used to evaluate the recording and reproduction characteristics.

The relationship between the UV-light irradiation time and the data error rate after $10^5$ overwriting operations were performed on the disk and the read-out error of the PID are shown in Table 8.

TABLE 8

| UV-light irradiation time of PID (second) | Error rate after $10^5$ time overwriting | Read-out error |
|---|---|---|
| 0 | $1 \times 10^{-2}$ | None |
| 60 | $1 \times 10^{-3}$ | None |
| 100 | $1 \times 10^{-4}$ | None |
| 150 | $1 \times 10^{-5}$ | None |
| 300 | $5 \times 10^{-5}$ | None |
| 450 | $1 \times 10^{-4}$ | None |
| 500 | $5 \times 10^{-3}$ | None |
| 600 | $1 \times 10^{-3}$ | None |
| 900 | $1 \times 10^{-2}$ | Occurred |

From the results, it was found that preferably the UV-light irradiation time should be from 60 to 600 seconds inclusive, and a more preferable range was from 100 to 450 seconds inclusive. Moreover, on the substrate surface that has undergone UV-light treatment, a SiN film 70 nm thick as the lower protective layer, a TeFeCo film 80 nm thick as the information recording layer, and a SiN film 70 nm thick were tacked.

The disk as mentioned above was used to evaluate the recording and reproduction characteristics with a mark width of 0.5 $\mu$m. A relationship between the UV-light irradiation and C/N (Carrier-to-Noise Ratio) is shown in Table 9.

TABLE 9

| UV-light irradiation time (second) | C/N (dB) |
|---|---|
| 0 | 48 |
| 60 | 52 |
| 100 | 52 |
| 150 | 53 |
| 300 | 53 |
| 450 | 53 |
| 500 | 52 |
| 600 | 52 |
| 900 | 49 |

From the results, it was found that preferably the UV-light irradiation time should be from 60 to 600 seconds inclusive, and a more preferable range was from 100 to 450 seconds inclusive.

Next, the change in the hardness of the polycarbonate substrate was examined. For this experiment, a Fischer Scope H100 (product of Fisher Co. ) was used. Since a flat surface is necessary to carry out this experiment, in the polycarbonate substrate, the surface opposite to the surface having the pits-and-lands pattern was irradiated with the UV-light and the difference between samples with and without the irradiation was compared in Table 10. The unit of hardness is N/mm$^2$.

TABLE 10

| UV-light irradiation time (second) | Hardness at 0.5 $\mu$m below surface | Hardness of inside 20 $\mu$m dep | Hardness of inside 100 $\mu$m deep |
|---|---|---|---|
| 0 | 139 | 104 | 80–100 |
| 60 | 141 | 106 | 80–100 |
| 100 | 150 | 110 | 80–100 |
| 300 | 162 | 116 | 80–100 |
| 600 | 173 | 121 | 80–100 |
| 900 | 175 | 122 | 80–100 |

From the results, it was found that the UV-light irradiation hardened the surface of the polycarbonate substrate. It is considered that this hardening is due to bridge formation of the material of the substrate surface by the UV-light. As is shown by the result of the error rate after the above-described $10^5$ overwriting operations, it is considered that the proof stress relative to the number of overwriting operations is improved through the hardening of the surface. For an irradiation time equal to 600 seconds or more, the change in the hardness becomes smaller.

The molecular weight histogram of the polycarbonate substrate was examined as a function of the UV-light irradiation time. As a measurement method, the GPC (Gel Permeation Chromatography) method was used. For the polycarbonate substrates with and without the UV-light irradiation, the surface of each substrate was sliced off from the surface to a depth of approximately 20 μm (roughly 0.5 g) with a single-edged knife and dissolved in 2 ml of a solvent (tetrahydrofuran) with an ultrasonic wave imposed for better dissolving to prepare measurement samples.

The value is one reduced to the polystyrene equivalent value and the molecular weight histogram is inferred from the weight-average molecular weight that indicates an average weight value of molecules having various molecular weight. If there Ni pieces of a high polymer whose molecular weight is Mi, the weight-average molecular weight is expressed by a formula $\Sigma NiMi2/\Sigma NiMi$.

The smaller the weight-average molecular weight is, the more the number of molecules having a smaller molecular weight is. An example of a relationship between the UV-light irradiation time and the weight-average molecular weight is shown in Table 11.

TABLE 11

| UV-light irradiation time (second) | Weight-average molecular weight |
|---|---|
| 0 | 3.2 |
| 30 | 3.1 |
| 60 | 3.0 |
| 100 | 2.8 |
| 150 | 2.8 |
| 300 | 2.7 |
| 450 | 2.5 |
| 600 | 2.4 |
| 900 | 2.3 |

Figure 4:
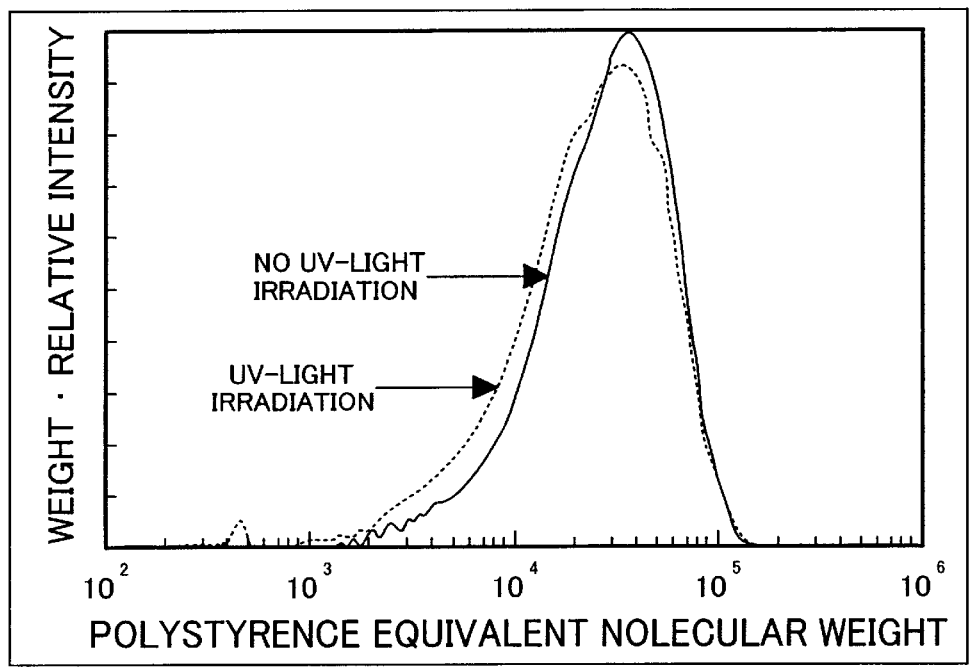
FIG. 4 is a graph showing a relationship between the UV-light irradiation time and a change in the molecular weight histogram of the substrate in the embodiment of the present invention.

The molecular weight histogram of the substrate surface becomes as shown in FIG. 4. Since molecules having an especially small molecular weight, such as a monomer, oligomer, etc. were hardly generated, and, if anything, the number of such molecules decreased in number, there was also confirmed an effect that the number of defects generated during a storage life test was decreased from about 10 pieces/cm² (without the UV-light irradiation) to 1 piece/cm² or less (with the UV-light irradiation). This also contributes to a decrease of the error rate. It is thought that this effect originates from an improvement of the adhesiveness between the interfaces of the layers. The polystyrene equivalent weight-average molecular weight of the substrate in the thickness range from the surface thereof to the depth of approximately 20 μm is smaller than that of the substrate excluding the surface parts from the surface to a depth of approximately 100 μm by 4 to 22%. In the case where the UV-light irradiation time is from 60 to 600 seconds inclusive, an excellent result of the error rate of $1\times10^{-3}$ or less was obtained. In the case where the UV-light irradiation time is from 100 to 450 seconds inclusive, a more excellent result of the error rate of $1\times10^{-4}$ or less was obtained.

On the polycarbonate substrate, a $ZnS-SiO_2$ film 100 nm thick as the lower protective layer, a Ge—Sb—Te film 6 nm thick as the information recording layer, and a $ZnS-SiO_2$ film 40 nm thick as the upper protective layer were stacked; and, further, on the layers so stacked, a Cr—O film 30 nm thick as the heat-diffusion layer and also as the reflective layer, and an Al—Ti film 80 nm thick were stacked. Using this disk, the disk reflectance was measured in a non-destructive manner. The reflectance from the polycarbonate substrate side was measured with a spectroscope. In a wavelength region from 330 to 360 nm, a change in the reflectance depending on the UV-light irradiation time was observed. The reflectance starts to increase from a wavelength of 330 nm, marks a peak at a wavelength of 345 nm, and thereafter decreases with increasing wavelength toward a wavelength of 360 nm. A change in disk reflectance depending on wavelength as a function of the UV-light irradiation time at a wavelength 345 nm is shown in Table 12.

TABLE 12

| UV-light irradiation time (second) | Reflectance depending on wavelength (%) |
|---|---|
| 0 | 10.5 |
| 30 | 10.0 |
| 60 | 8.0 |
| 100 | 7.5 |
| 300 | 6.0 |
| 450 | 5.0 |
| 600 | 4.8 |
| 900 | 4.7 |

This result leads to a postulation that, by measuring the disk reflectance depending on wavelength, whether the UV-light treatment has been conducted, its conditions, the state of the substrate surface, etc. can be inferred. Moreover, in a wavelength region from 500 to 800 nm, a change due to the UV-light irradiation was observed. Regardless of the UV-light irradiation time, the reflectance shows a gradual increase in a wavelength region from 500 to 800 nm. However, it was confirmed that the reflectance became higher with increasing time of UV-light irradiation. A relationship between the UV-light irradiation time and the reflectance depending on wavelength of the disk at a 700 nm wavelength is shown in Table 13.

TABLE 13

| UV-light irradiation time (second) | Reflectance depending on wavelength of the disk (%) |
|---|---|
| 0 | 10.5 |
| 30 | 11.0 |
| 60 | 11.5 |
| 100 | 12.0 |
| 300 | 13.5 |
| 450 | 14.0 |
| 600 | 14.5 |
| 900 | 15.0 |

This result leads to a postulation that, by measuring the spectral reflectance of the disk, whether the UV-light treatment has been conducted, its conditions, the state of the substrate surface, etc. can be inferred.

By the way, the molecular weight histogram of the substrate surface was measured again after the recording medium layer was removed from the above-described disk whose recording characteristics had been evaluated, and the same result as those obtained before the stacking of the recording medium layer was obtained.

The transmittance and the hardness of the substrate are the same as those before the stacking of the recording medium layer. The result is shown in Table 14.

TABLE 14

| UV-light irradiation time (second) | Substrate transmittance (%) | Hardness at 0.5 μm depth below surface |
|---|---|---|
| 0 | 60 | 139 |
| 30 | 52 | |
| 60 | 32 | 141 |
| 100 | 28 | 150 |
| 150 | 25 | |
| 300 | 17 | 162 |
| 450 | 15 | |
| 600 | 12 | 173 |
| 900 | 10 | 175 |

According to the present invention, without damaging the shape of the pits-and-lands pattern on the surface consisting of the light spot tracking-guide grooves and/or the address pits necessary for the optical disk, the fine irregularities that are generated, irrespective of the manufacturing objectives, on the surface of the optical disk substrate can be reduced.

By the way, the ozone concentration between the photoresist stamper or the substrate and the light source after the UV-light irradiation for 600 seconds was measured to find a concentration not more than 0.1 ppm.

Second Embodiment

A metal stamper was fabricated through nickel electric plating using a photoresist-coated master, which had an information surface in the form of a pits-and-lands pattern consisting of emboss-pits. Then, polycarbonate was melted at a raised temperature and poured into the mold in which the stamper is placed and pressurized to form the substrate. After being cooled so as to become hardened, it was taken out of the mold, so that an optical disk substrate made of polycarbonate was produced. Further, by irradiating UV-light on the pits-and-lands pattern of the substrate for 150 seconds, the fine irregularities generated on the surface of the optical disk, irrespective of the manufacturing objectives, were smoothed.

Here, the average surface roughness, the depth of the information pits-and-lands pattern, and the read-out error rate of the information surface were measured while varying the UV-light irradiation time and the results are shown in Table 15.

TABLE 15

| UV-light irradiation time (second) | Average surface roughness (nm) | Information pits-and-lands pattern (nm) | Read-out error rate of information surface (%) |
|---|---|---|---|
| 0 | 1.0 | 102.8 | 6.4 |
| 30 | 1.0 | 101.4 | 6.2 |
| 60 | 0.8 | 100.6 | 5.8 |
| 100 | 0.7 | 99.9 | 5.6 |
| 150 | 0.6 | 98.0 | 5.4 |
| 300 | 0.5 | 95.1 | 5.6 |
| 450 | 0.5 | 91.0 | 5.7 |
| 600 | 0.6 | 86.8 | 5.8 |
| 900 | 1.3 | 78.5 | 6.4 |

As can be understood from this result, it is necessary to determine the UV-light irradiation time so that the depth of the information pits-and-lands pattern and the read-out error rate of the pits become desired values.

In the whole substrate that is manufactured or in a surface range from the surface, where an information pits-and-lands pattern is formed, to the depth of a few μm therefrom in the depth direction, the molecular structure changes to some degree depending upon the temperature and the pressure at the time of injection molding; therefore, the reaction to the UV-light irradiation naturally differs. Therefore, the optimum time may vary depending on the injection conditions and the material used.

Third Embodiment

Similarly, UV-light irradiation was conducted on a photoresist surface of a photoresist-coated master that has pits-and-lands pattern consisting of light spot racking-guide grooves and/or address pits, sector marks, emboss-pits, such as the pits for recording information etc., on the surface. The surface of the photoresist master was measured with an AFM and the result is shown in Table 16.

TABLE 16

| UV-light irradiation time (second) | Irradiation energy density (J/cm$^2$) | Average surface roughness on center line (nm) |
|---|---|---|
| 0 | 0.0 | 0.6 |
| 30 | 3.9 | 0.6 |
| 60 | 7.8 | 0.5 |
| 100 | 13.0 | 0.5 |
| 150 | 19.5 | 0.4 |
| 300 | 39.0 | 0.4 |
| 500 | 58.5 | 0.4 |
| 600 | 78.0 | 0.5 |
| 900 | 117.0 | 0.6 |

As can be seen from the result, although UV-light irradiation has an effect of smoothing the surface depending on the time irradiation, if it is too long, the surface becomes coarse conversely and the average surface roughness on the center line becomes large.

As is described in the foregoing, the present invention has the effect that an optical disk substrate can be produced that excels in adhesiveness and has a small number of defects and possesses a smooth information surface free from fine irregularities generated, irrespective of the manufacturing objectives, without changing the fabrication processes of the conventional optical disk substrate, but with an additional processing added. As a result, the recording and reproduction characteristics were improved and a low error rate was achieved, so that the performance of the optical disk has been improved.

Although the invention has been described in its preferred form with a certain degree of particularity, it is understood that the present disclosure of the preferred form can be changed in the details of construction and the combination and arrangement of parts without departing from the spirit and the scope of the invention as hereinafter claimed.

Fourth Embodiment

Figure 5:
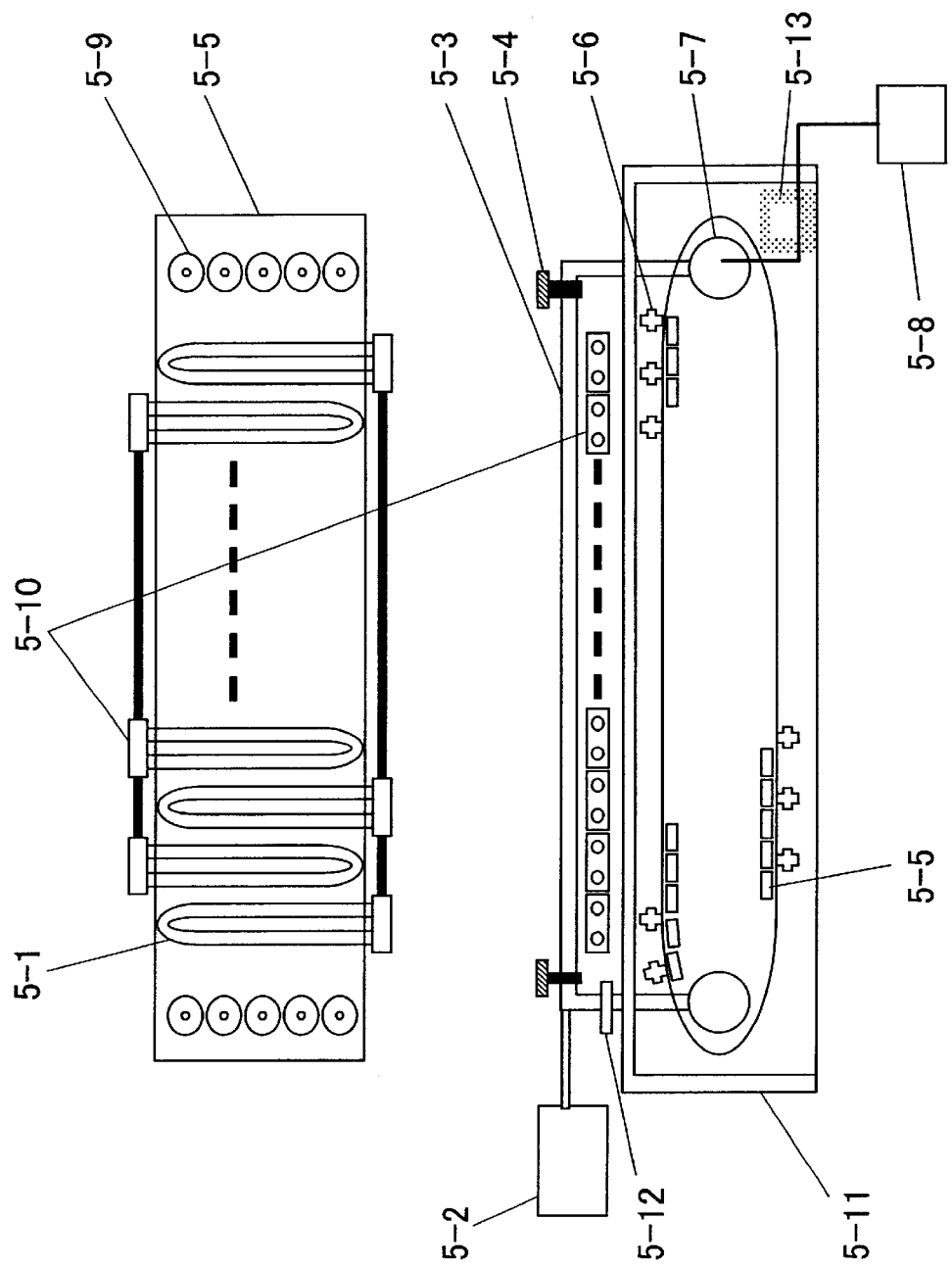
FIGS. 5A and 5B are top and side views, respectively, of the apparatus for manufacturing an optical disk substrate which forms one embodiment according to the present invention.

One embodiment of an apparatus for manufacturing an optical disk substrate, for the case where the method of manufacturing an optical disk substrate according to the present invention that was described in detail in the foregoing is carried into practice for mass production, will be described in the following. FIGS. 5A and 5B illustrate one example of the apparatus for manufacturing an optical disk substrate according to the present invention that is suited for mass production. This apparatus consists of a lamp housing and a belt conveyer assembly for substrate transportation. Further, the lamp housing is composed of ultraviolet lamps 5-1, an ultraviolet lamp power supply 5-2, a UV-light shield 5-3, a lamp height adjustment mechanism 5-4, and a socket 5-10 for each lamp; and, the belt conveyer assembly for substrate transportation is composed of a conveyer belt 5-5, substrate holders 5-6, a motor 5-7, a motor rotational speed controller 5-8, and a belt conveyer support pedestal 5-11. Moreover, as illustrated in FIG. 5A, the optical substrate 5-9 is mounted on a substrate holder with a signal surface thereof (a surface on which the unevenness is formed) facing the ultraviolet lamp side and is made to pass below the lamp housing, so that mass production of the low-noise optical disk substrate according to the present invention becomes possible.

For the UV-light source, a low-pressure mercury lamp is used in which the UV-light emission part thereof is U-shaped and emits UV-light whose main wavelength is 254 nm, while shielding light having a wavelength of 185 nm. Further, to irradiate the optical disk substrate uniformly with the UV-light, the ultraviolet lamps are arranged so as to be symmetrical relative to the direction of transportation of the optical disk substrate. Furthermore, a UV-light illuminance meter is set on the belt conveyer and the accumulative illuminance distribution is measured while the optical disk substrate is transported at the same speed as that of actual transportation during the manufacturing process. It was found that at any point in a region of 65 mm (the length of an emission part of each lamp being 75 mm) the illuminance became ±5% or less of the target illuminance distribution. In this case, the surface measurement of the UV-light illuminance meter was adjusted so as to be of the same height as that of the signal surface of the optical disk substrate. Thus, when U-shaped ultraviolet lamps are used, it is important to arrange these lamps symmetrically relative to the direction of transportation of the optical disk in order to increase the uniformity of the illuminance distribution.

In this apparatus, 15 ultraviolet lamps as described above are used. Moreover, a power supply switch for each lamp is provided independently, so that the lamps to be lighted can be selected. Further, each of the se lamps is mounted on a respective socket 5-5, so that sockets corresponding to the number of the lamps are provided.

Furthermore, since UV-light exerts harmful effects on the human body, the UV-light shield 5-3 made of stainless steal for shielding the UV-light is provided. Further,the sockets5-10 are united with UV-light shield 5-3, with the lamp height adjustment mechanism 5-4 disposed therebetween. Moreover, the UV-light shield 5-3 is united with the belt conveyer support pedestal 5-11. The lamp height adjustment mechanism 5-4 has a screw mechanism in it and by rotating a top of the lamp height adjustment mechanism 5-4, the height of the socket 5-10 can be adjusted.

On the conveyer belt 5-5, a plurality of substrate holders 5-6 are fixed at intervals corresponding to the size of the optical disk substrate 5-9. Each substrate holder 5-6 has a protruding part whose size corresponds to a hole provided in the center of the optical disk substrate 5-9, and five sheets of optical disk substrates 5-9 are mounted thereon collectively by a robot arm. The conveyer belt 5-5 is configured to be rotated by the motor 5-7. Further, the motor 5-7 is fixed on the belt conveyer support pedestal 5-11. Rotation of the motor 5-7 is controlled by the motor rotational speed controller 5-8.

In addition a gas inlet 5-12 is provided in the apparatus for manufacturing an optical disk substrate according to the present invention, and an oxygen containing gas is provided therethrough into this apparatus as described above. Moreover, a gas outlet 5-13 is provided in the apparatus for manufacturing an optical disk substrate according to the present invention, which outlet that is designed to be capable of exhausting efficiently an organic substance containing gas, which is generated by the UV-light irradiated onto the optical disk substrate.

In the case where a mass production trial is conducted with the apparatus as configured in this way, the manufacturing time per one sheet of the optical disk substrate can be reduced to 5 seconds or so. Along with the trial, a radial dependency, and a circumferential dependency of the noise reduction effect of the optical disk substrate were measured and confirmed to be not more than 0.5 dB, respectively, producing no problem from a practical standpoint. Thus, the apparatus for manufacturing an optical disk substrate according to the present invention is suited for mass production of optical disk substrates.

However, when a mass production trail for ten thousand hours or more was carried out, it was found that two problems occurred. One of the problems is that, since the emission intensity of the ultraviolet lamp decreases gradually with UV-light irradiation over a long period of time, the ultraviolet lamp needs replacement frequently. Generally, the emission intensity of the mercury lamp decreases to 70% or so of the initial emission intensity after operation for ten thousand hours or so. As a result of this, there arises a problem that the noise reduction effect on the optical disk substrate grows weak. To solve these problems, the following methods were tried.

(1) The number of the ultraviolet lamps in operation to emit light is changed in accordance with the lapse of time so that the accumulative illuminance of the substrate surface irradiated by the UV-light becomes constant.

For example, at the initial stage, 10 lamps among 15 lamps are used. If that the accumulative illuminance created by one new lamp is 1 unit, the accumulative illuminance created by UV-light from 10 lamps amounts to 10 units. In order to achieve a sufficient noise reduction effect with an accumulative illuminance of 10 units, the rotational speed of the motor 5-7 of the belt conveyer and the distance between the optical disk substrate 5-9 and the ultraviolet lamp 5-1 are adjusted by the motor rotational speed controller 5-8 and by the lamp height adjustment mechanism 5-4, respectively. After setting the apparatus in this way, the surface processing of the optical disk substrate 5-9 is conducted and the number of ultraviolet lamps in operation to emit light is controlled so that the accumulative illuminance that otherwise decreases with the lapse of time is always kept to 10 units or so. This method makes it possible to always obtain a constant accumulative illuminance just by changing the number of ultraviolet lamps in operation to emit light with the ultraviolet lamp power supply 5-2; therefore, this is an excellent method. By adopting this scheme, even after the ultraviolet lamps have been in operation to emit light for ten thousand hours, the accumulative illuminance can be adjusted to 10 units or so by changing the number of ultraviolet lamps in operation to emit light. A weak point of this method is that each time the member of ultraviolet lamps in operation to emit light is increased by one lamp, the accumulative intensity suffers an abrupt change and hence its lacks controllability.

(2) The moving speed of the optical disk substrate 5-9 is slowed so that the accumulative illuminance of the substrate surface irradiated by the UV-light becomes constant.

For example, initially all of the 5 lamps are lighted and the moving speed of the optical disk is adjusted by the motor rotational speed controller 5-8 so that the accumulative illuminance amounts to 10 units or so. Further, the distance between the optical disk substrate 5-9 and the ultraviolet lamp 5 -1 is adjusted by the lamp height adjustment mechanism 5-4. After setting the apparatus in this way, the surface processing of the optical disk substrate 5-9 is conducted and the moving speed of the optical disk substrate 5 - 9 is altered by the motor rotational speed controller 5-8 so that the accumulative illuminance that otherwise decreases with the lapse of time is always kept to 10 units or so. Thus, the accumulative illuminance can always be controlled to 10 units or so by controlling the moving speed of the optical disk substrate 5-9 with the passage of time. For example, even after ten thousand times of UV-light irradiation, an accumulative illuminance of 10 units or so can be achieved by decreasing the moving speed of the optical disk substrate 5-9 to 70% or so of the initial value. A weak point of this method is that the production time (tact time) per one sheet of the optical dis4 t substrate changes with the lapse of time. This weak point will cause no problem when the noise reduction process performed by the UV-light irradiation according to the present invention is conducted independently of other processes. However, when this noise reduction process is conducted on the line to work with the other processes, the variation of the processing time is not preferable.

(3) The distance between the optical disk substrate 5-9 and the ultraviolet lamp is altered so that the accumulative illuminance of the substrate surface irradiated by the UV-light becomes constant.

For example, the procedure is as follows. First, all of the 15 lamps are made to emit light and the distance between the optical disk substrate 5-9 and the ultraviolet lamps 5-1 is adjusted to 10 mm by the lamp height adjustment mechanism 5-4. Further, the moving speed of the optical substrate 5-9 is adjusted by the motor rotational speed controller 5-8 so that the accumulative illuminance amounts to 10 units or so. In this way, while the surface processing of the optical disk substrate 5-9 is conducted, the distance between the optical disk substrate 5-9 and the ultraviolet lamp 5-1 is adjusted by the lamp height adjustment mechanism 5-4 so that the accumulative illuminance that otherwise decreases with the lapse of time is always kept to 10 units or so. By controlling the distance between the optical disk substrate 5-9 and the ultraviolet lamp 5-1 with the course of time, the accumulative illuminance can be always controlled to 10 units or so in this way. For example, even after ten thousand times of UV-light irradiation, an accumulative illuminance of 10 units or so can be achieved by reducing the distance between the optical disk substrate 5-9 and the ultraviolet lamp 5-1 to 5 mm or so. With this method, the production time per one sheet of the optical disk substrate (tact time) can be kept unchanged and high-precision control is possible; therefore, this method was found to be the most excellent method.

Naturally, it is possible to use one of the methods (1) (2) (3) appropriately as the need arises, and it is needless to say that no problem occurs even if some of the methods are used together. As previously described, when the above-stated apparatus was used in a mass production trial, there arose two problems. The other of the problems is a problem in which, depending on the material and shape of the substrate holder, the optical disk substrate undergoes thermal deformation or the substrate holder itself deteriorates due to the UV-light irradiation.

The substrate holder 5-6 has to be made of a material that is chemically and thermally stable in which it is and hard to generate heat even when UV-light is absorbed as it is exposed to intense UV-light. The present inventors have tested various plastics and metals for the substrate holder in terms of material, and, from the results of the test, it has been found that fluoroplastics are most suitable for the material of the substrate-holder 5-6. It was found that among the fluoroplastics, specifically polytetrafluoroethylene (ploy (difluoromethylene)) and ploy(chlorotrifluoroethylene) are best suited materials because of certain characteristics such as their being chemically stable, hard to undergo thermoplastic deformation, easy to process etc. When the substrate holder was made of metals, such as aluminum, stainless steal, etc., there arose a problem in that a part thereof irradiated by the UV-light generated heat, markedly and due to this heat, the optical disk substrate was deformed. Moreover, when plastics, such as polycarbonate, polyethylene, etc. are used for the substrate holder, under continuous use over several months, there arose a problem in that the substrate holder developed cracking on its surface; or, because of decomposition caused by the UV-light irradiation, the surface of the substrate holder was shaved off and deformed, and the like. When fluoroplastics are used, such a problem did not occur.

By the way, it is better to make the shape of the substrate holder smaller as long as it can be kept horizontally. The mercury lamp used in accordance with the present invention also generates also light of visible wavelengths other than UV-light. Since these visible light rays will penetrate a transparent substrate member used for the optical disk substrate, the visible light rays in such case will reach the substrate holder. As a result, the visible light rays absorbed by the substrate holder generate heat. Because of this, for example, in the case of a substrate holder for a DVD-RAM substrate in which the diameter of the center hole is 15 mm, the diameter of the substrate is 120 mm, and the diameter of a flat portion in the vicinity of the center, it is recommended that the diameter of a protruding portion of the substrate holder be 7±0.5 mm and the diameter of the substrate holder be 30 to 33 mm. If the diameter of the substrate holder exceeds a diameter that forms a boundary of an information recording region (44 mm), an effect due to deformation of the substrate caused by heat generation of the substrate holder becomes obvious; therefore such diameters are undesirable on the other hand, if the diameter of the substrate holder is not more than 30 mm, it becomes difficult for the substrate holder to hold the optical disk substrate stably; therefore, such diameters are undesirable.

As described in the foregoing, the present invention brings about an effect in which an optical disk substrate, that excels in adhesiveness. has a small number of defects, and possesses a smooth information surface free from fine irregularities that may occur unintentionally, can be manufactured by conducting post processing without altering the manufacturing process of the conventional optical disk substrate. As a result, recording/reproducing characteristics of the optical disk were enhanced and a low error rate was achieved, so that performance of the optical disk was improved.

Moreover, by using a UV-light source that irradiates light having a wavelength of approximately 254 nm and that shields light having a wavelength of approximately 185 nm as a lamp for irradiating the UV-light, it becomes possible to suppress the generation of ozone that impedes the effect of the present invention; therefore, it becomes possible for a large quantity of optical disk substrates to be processed in an extremely short time.

Further, by controlling the distance of the UV-light source and the optical disk substrate, even when the emission intensity of the UV-light varies, the effect of the present invention on the optical disk substrate can be kept constant.

Moreover, by making the UV-light source and the optical disk substrate move relative to each other, it becomes possible to conduct uniform processing on the whole surface of the optical disk substrate.

Furthermore, by controlling the UV-light accumulative illuminance of the optical disk substrate irradiated by the UV-light source, even when the emission intensity of the UV-light varies with the lapse of time, the effect of thee present invention on the optical disk substrate can be always kept constant.

For methods of controlling the accumulative illuminance of the UV-light, the following methods are effective: (1) a method of changing the number of the UV-light sources which re placed in operation to emit light over the course of time so that the accumulative illuminance is always kept constant; (2) a method of controlling the relative moving speed of the optical disk substrate over the course of time so that the accumulative illuminance is always kept constant; and (3) a method of changing the distance between the UV-light source and the optical disk substrate over the course of time so that the accumulative illuminance is always kept constant.

Further, by using a substrate holder made of a fluoroplastic, such as polytetrafluoroethylene etc., to hold the optical disk substrate, substrate deformation that occurs during the UV-light irradiation can be suppressed in the apparatus for manufacturing the optical disk substrate.

What is claimed is:

1. A method of manufacturing an optical disk substrate, comprising a process of reforming the surface of polycarbonate by flowing an oxygen containing gas on the optical disk substrate composed of a plastic material containing oxygen atoms on the main organic atomic-chain thereof and having irregularities on its surface and by irradiating the optical disk substrate with ultraviolet light so that ozone generated on the optical disk substrate becomes not more than 0.1 ppm.

2. A method of manufacturing an optical disk substrate according to claim 1, wherein the ultraviolet light has a wavelength of 254 nm.

3. A method of manufacturing an optical disk substrate according to claim 1, wherein the plastic material is polycarbonate.

4. An apparatus of manufacturing an optical disk substrate that conducts surface processing of the optical disk substrate, comprising:
    (a) an ultraviolet light source for generating ozone whose concentration in the manufacturing apparatus when an oxygen containing gas is made to flow is not more than 0.1 ppm; and
    (b) means for changing the distance between the optical disk substrate and the ultraviolet light source relatively.

5. An apparatus of manufacturing an optical disk substrate according to claim 4, wherein the ultraviolet light has a wavelength of 254 nm.

6. An apparatus of manufacturing an optical disk substrate that conducts surface processing on an optical disk substrate, comprising:
    (a) an ultraviolet light source for generating ozone whose concentration in the manufacturing apparatus when an oxygen containing gas is made to flow is not more than 0.1 ppm; and
    (b) means for making the optical disk substrate and the ultraviolet light source perform relative motion to each other.

7. An apparatus of manufacturing an optical disk substrate according to claim 6, wherein the ultraviolet light has a wavelength of 254 nm.

8. An apparatus of manufacturing an optical disk substrate that conducts surface processing of the optical disk substrate, comprising:
    (a) an ultraviolet light source for generating ozone whose concentration in the manufacturing apparatus when an oxygen containing gas is made to flow is not more than 0.1 ppm; and
    (b) means for controlling the time of ultraviolet light irradiation from the ultraviolet light source onto the optical disk substrate.

9. An apparatus of manufacturing an optical disk substrate according to claim 8, wherein the ultraviolet light has a wavelength of 254 nm.

10. An optical disk substrate, the substrate being made of a plastic material, having the transmittance not more than 50 % at one wavelength in a wavelength region from 300 to 375 nm.

11. An optical disk substrate according to claim 10, wherein the average surface roughness (Ra) of the irregularities of the surface of the optical disk substrate is not more than 08 nm.

12. An optical disk substrate according to claim 10, wherein the hardness of the optical disk substrate in a thickness range from the surface thereof to the depth of 0.5 $\mu$m is higher than that of the substrate excluding the surface parts from the surface to the depth of 100 $\mu$m by 50 to 85%.

13. An optical disk substrate according to claim 12, wherein the hardness of the substrate in the thickness range from the surface thereof to the depth of 0.5 $\mu$m is not less than 140N/mm$^2$.

14. An optical disk substrate made of a plastic material, wherein the polystyrene equivalent weight-average molecular weight of the substrate in the thickness range from the surface thereof to the depth of 20 $\mu$m is smaller than that of the substrate excluding the surface parts from the surface to the depth of 100 $\mu$m by 4 to 22%.

15. A method of manufacturing an optical disk substrate, comprising a process of reforming the surface of polycarbonate by flowing an oxygen containing gas on the optical disk substrate composed of a plastic material containing oxygen atoms on the main organic atomic-chain thereof and having irregularities on its surface and by irradiating ultraviolet light of a wavelength of approximately 254 nm on the optical disk substrate while shielding ultraviolet light of a wavelength of approximately 185 nm.

16. An apparatus of manufacturing an optical disk substrate that conducts the surface processing of the optical disk substrate, comprising:
    (a) an ultraviolet light source for irradiating light of a wavelength of approximately 254 nm while shielding light of a wavelength of approximately 185 nm; and
    (b) means for making the distance between the optical disk substrate and the ultraviolet light source change relatively.

17. An apparatus of manufacturing an optical disk substrate that conducts the surface processing of the optical disk substrate, comprising:
    (a) an ultraviolet light source for irradiating light of a wavelength of approximately 254 nm while shielding light of a wavelength of approximately 185 nm; and (b) means for making the optical disk substrate and the ultraviolet light source perform relative motion to each other.

18. An apparatus of manufacturing an optical disk substrate that conducts the surface processing of the optical disk substrate, comprising:
   (a) an ultraviolet light source for irradiating light of a wavelength of approximately 254 nm while shielding light of a wavelength o f approximately 185 nm; and
   (b) means of r controlling the time of ultraviolet light irradiation from the ultraviolet light source onto the optical disk substrate.

19. An apparatus of manufacturing an optical disk substrate that conducts the surface processing of the optical disk substrate, comprising:
   (a) a plurality of ultraviolet light sources for irradiating light of a wavelength of approximately 254 nm while shielding light of a wavelength of approximately 185 nm; and
   (b) means for controlling emission energy of each of the ultraviolet light sources independently.

20. An apparatus of manufacturing an optical disk substrate according to claim 17, comprising a substrate holder made of a fluoroplastic for holding the optical disk substrate.

21. An apparatus of manufacturing an optical disk substrate according to claim 20, wherein the fluoroplastic is polytetrafluoroethylene.

* * * * *